United States Patent Office 3,605,532
Patented Sept. 20, 1971

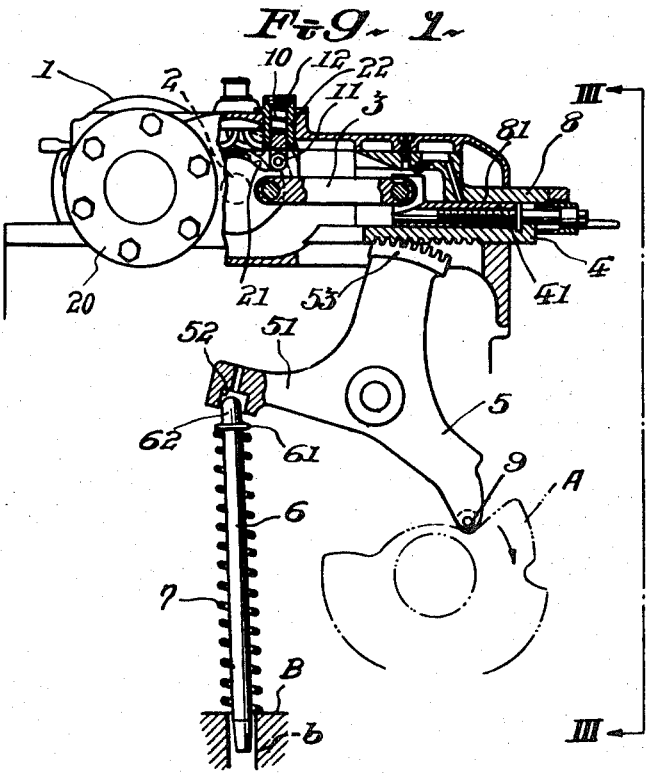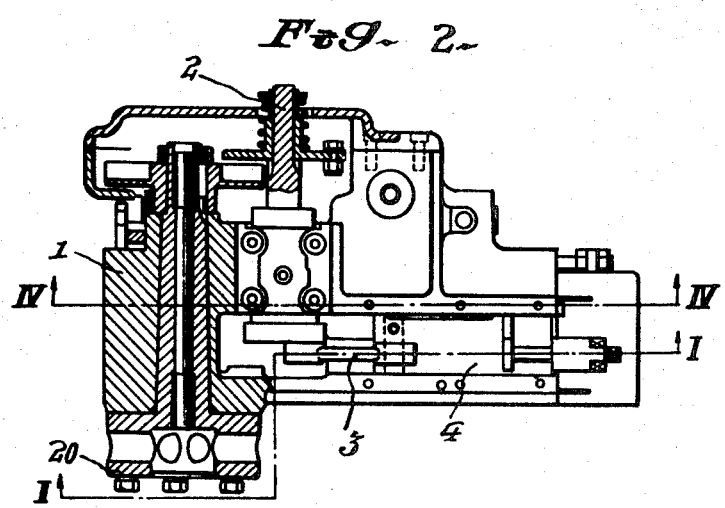

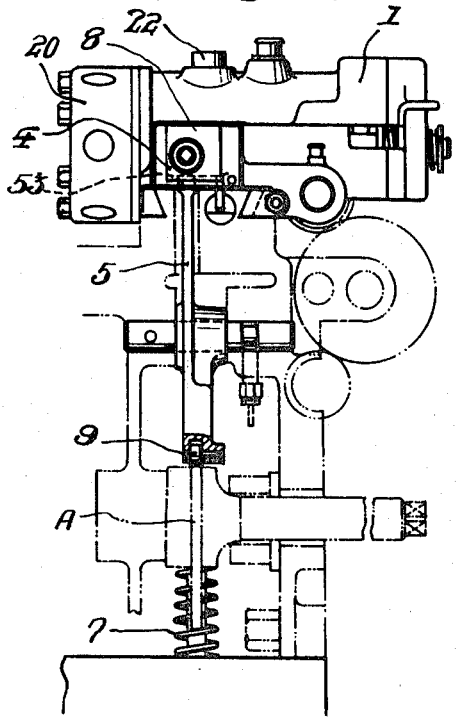
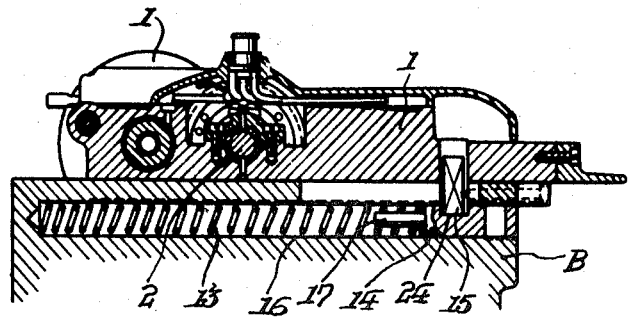

3,605,532
TURRET-SLIDE FEED MECHANISM FOR TURRET TYPE SINGLE-SPINDLE AUTOMATIC MACHINES
Kyushichiro Tanaka, Nagaoka-shi, Japan, assignor to Kabushiki Kaisha Tsugami Seisakusho, Tokyo, Japan
Filed Dec. 8, 1969, Ser. No. 883,177
Claims priority, application Japan, Dec. 19, 1968, 43/92,653
Int. Cl. B23b 21/00
U.S. Cl. 82—21       7 Claims

ABSTRACT OF THE DISCLOSURE

The positioning accuracy of the turret slide is much improved by use of a relatively strong slide-restoring spring acting directly upon the turret-actuating cam-follower lever and a relatively weak spring effective to eliminate backlash at connections between the cam follower lever and the turret index shaft. Such improvement is further ensured by a third spring enabling the index shaft to have a definite stop position.

---

The present invention relates to turret type single-spindle automatic machines and more particularly to their turret and turret-slide feed mechanism.

The turret slide of a turret-type single-spindle automatic machine generally includes a turret feed mechanism and a turret indexing mechanism. The previously known type of turret feed mechanism includes a turret-slide restoring spring which is arranged to hold a roller carried on a turret-actuating cam lever in pressure contact with the camming surface of the lead cam so that the movement of the turret slide may be effected under exact control of the lead cam. On the other hand, the indexing mechanism includes an index drive gear of long cylindrical shape arranged to be momentarily driven from the drive shaft to turn an eccentric index plate through an intermediate gear, which index plate in turn causes an indexing operation of the turret head by way of a Geneva mechanism.

Such conventional turret feed mechanism, in which the power of the turret-slide restoring spring is applied directly to the eccentric index plate and associated crank rod and a rack members, has involved the following various deficiencies:

(1) The interconnections between the eccentric index shaft, crank rod and rack members are subject to severe wear.

(2) With the wear of the rack teeth and the gear teeth on the turret-actuating cam lever meshing therewith, the amount of backlash between the two gear members increases.

(3) The driving power between the gear members, acting along their line of action, causes a substantial pressure between the sliding surfaces of the rack and its holding cover and hence a correspondingly large wear thereon.

(4) The resulting clearance makes it difficult to fix the rack and the crank rod connected therewith in their predetermined position.

(5) Use of a turret-slide restoring spring of smaller spring rate with the intention of minimizing wear of the turret parts is liable to make the turret indexing unstable owing to the increase in tendency of the turret cam roller to float away from the surface of the lead cam with the result that the longitudinal positioning of the turret slide is impaired in accuracy.

The present invention has for its object to provide a turret feed mechanism which is free from the deficiencies described above. According to the invention, there is provided a novel turret feed mechanism characterized by the fact that it comprises first spring means arranged to hold the turret cam roller in pressure contact with the lead cam, second spring means of a smaller spring rate arranged to eliminate any backlash between the eccentric index shaft and associated crank rod and rack members, third spring means for providing a definite stop position for the eccentric index shaft, and including a plunger and a cam formation associated therewith.

The above and other objects, features and advantages of the present invention will become apparent from the following description when taken in conjunction with the accompanying drawings, which illustrate one preferred embodiment of the invention and in which:

FIG. 1 is a fragmentary front elevation of the embodiment, partly in vertical cross section, taken along the line I—I in FIG. 2;

FIG. 2 is a plan view of same;

FIG. 3 is a side elevation looking from the line III—III in FIG. 1; and

FIG. 4 is a cross section taken along the line IV—IV in FIG. 2.

Referring to the drawings, reference numeral 1 indicates the turret slide body; and 2 indicates an eccentric index shaft rotatably mounted in the turret slide 1 and carrying a cam 21. Numeral 3 indicates a crank rod interconnecting the eccentric index shaft 2 and a rack member 4; and 5 indicates a turret-actuating cam lever carrying a turret cam roller 9, which follows the profile of the lead cam A. 6 indicates a vertically arranged plunger rod having a top projection 62, which is inserted in an aperture 52 formed in one arm end 51 of the turret-actuating cam lever 5, and also having a collar 61 formed adjacent to the projection 62 to engage the lever arm 51 around the aperture 52. The plunger rod 6 is inserted at the bottom in an aperture b formed in the machine bed B and is thus longitudinally movable with the forward and backward movement of the turret slide 1. A compression coil spring 7 encircling the plunger rod 6 is arranged between the machine bed B and the collar 61 on the rod 6. The compression spring 7, normally biasing the lever arm 51 upwardly, is effective to hold the turret cam roller 9 in pressure contact with the lead cam A so that the motion of the latter is transmitted to the turret slide with accuracy. Numeral 8 indicates a rack holder cover having a bottom surface 81 held at all times in sliding contact with the top surface of the rack member 4.

A compression coil spring 10 is arranged in a sleeve 22 fixed in the turret slide 1 and normally holds a plunger 11, which is axially slidable in the sleeve 22, in pressure contact with the cam 21 on the eccentric index shaft 2. As shown, the compression spring 10 is arranged between an adjusting screw 12 and the top end 19 of plunger 11.

As shown in FIG. 4, a long horizontal bore 16 is formed in machine bed B longitudinally thereof and receives a relatively long and weak compression coil spring 13, which serves to eliminate any backlash between the eccentric index shaft 2, crank rod 3 and rack member 4. The spring 13 is secured at one end to the machine bed B and abuts at the other end against the adjacent end of a plunger 14, which is slidably fitted in the horizontal bore 16 and has an end projection 17 fitted in the spring end. A notch 24 is formed in one side of the plunger 14 to engagingly receive a pin 15 connected with the turret slide body 1.

In the shown and described construction of the turret feed mechanism of the automatic machine embodying the present invention, the power of turret-slide restoring spring 7 is transmitted directly to the turret-actuating cam lever 5 but not by way of the rack member as usual in previous turret lathes and under this spring power the turret cam roller 9 is held at all times in contact with the camming surface of the lead cam A. With this arrangement, it will be apparent that the force acting between the teeth of rack 4 and those of a sector gear 53 formed on the turret-actuating cam lever 5 is independent from the turret-slide restoring spring. In other words, the turret slide 1 is only subject to the limited action of spring 13, which has a minimum spring rate as required to eliminate backlash between the eccentric index shaft 2, crank rod 3 and rack 4. Accordingly, wear of any relating parts described herein is markedly reduced, minimizing change in backlash therebetween. This apparently makes it possible to maintain a high degree of working accuracy for an extraordinarily long period.

It is also to be understood that the present invention enables use of a turret-slide restoring spring 7 having a spring rate high enough to enable the turret cam roller 9 to follow the lead cam A exactly and this makes possible realization of a turret slide which can rapidly advance and retract and enables accurate turret indexing.

Further, the provision of spring 10 and plunger 11, acting upon the cam 21 on the index shaft 2 to enable the latter to stop at all times in a predetermined position, is effective to prevent any fluctuation of crank rod 3 and thus aids in improving the accuracy of the longitudinal positioning of the turret slide.

The invention is not restricted to the features described above and shown in the drawings but may be varied in many ways within the scope of the appendant claims.

I claim:

1. A turret feed mechanism for a turret type single-spindle machine in which the turret is linearly slidably carried by the machine base, comprising:
    a rack attached to the turret and slidable therewith;
    a sector gear engaging the teeth of the rack and mounted for rotation on the machine base;
    a lever arm rigidly attached to the sector gear;
    a cam mounted for rotation on the machine base and contacting an outer end of the lever arm to impart rotational motion to the lever arm and sector gear;
    first biasing means contacting the machine base and urging the outer end of the lever arm into contact with the cam; and
    second biasing means contacting the machine base and urging the turret toward its retracted position.

2. The feed mechanism according to claim 1 wherein the first biasing means comprises a second lever arm rigidly attached to the sector gear and a compression spring engaging the outer end of the second arm and the machine base and exerting a force on the second arm opposing the rotational force imparted by the cam, the compression spring being of sufficient strength to maintain the end of the first arm in constant contact with the cam.

3. The feed mechanism according to claim 2 wherein the second biasing means comprises a second compression spring engaging the turret and the machine base and exerting a force in the turret opposing the force imparted thereto through the rack and sector gear upon rotation of the sector gear by the cam, the strength of the second spring being less than the strength of the first spring.

4. The feed mechanism according to claim 1 wherein the turret is slidable relative to the rack and further including an eccentric rotationally mounted on the turret, means to rotate the eccentric, and a crank rod attached at one end to the eccentric and at its opposite end to the rack.

5. The feed mechanism according to claim 4 wherein the eccentric has a stop position and further including third biasing means for urging the eccentric and the crank rod to the stop position.

6. In a machine having a turret linearly slidably mounted on the machine base, a feed mechanism for moving the turret between first, retracted position, and a second, advanced position, comprising:
    a rack attached to the turret and slidable therewith;
    a sector gear engaging the rack and mounted for rotation on the machine base;
    means for rotating the sector gear through an arc whereby the rack and turret are moved from the first to the second position;
    first biasing means acting on the sector gear in opposition to the means for roating; and
    second biasing means acting on the turret to urge the turret toward the first, retracted position.

7. The feed mechanism according to claim 6 wherein the turret is linearly slidable relative to the rack and further including means carried by the turret for imparting linear motion to the turret relative to the rack.

References Cited

UNITED STATES PATENTS 3,262,345  7/1966  Spohn et al. _____ 82—21A

FOREIGN PATENTS 919,256  2/1963  Great Britain _____ 82—21

LEONIDAS VLACHOS, Primary Examiner

U.S. Cl. X.R.

74—53